US011001234B2

(12) United States Patent
Guethle et al.

(10) Patent No.: US 11,001,234 B2
(45) Date of Patent: May 11, 2021

(54) NOTCHED COMPACTOR CLEANER FINGER

(71) Applicant: Caterpillar Inc., Deerfield, IL (US)

(72) Inventors: Marcus Guethle, Oswego, IL (US); Brian Chandler, Saint Charles, IL (US)

(73) Assignee: Caterpillar Inc., Peoria, IL (US)

( * ) Notice: Subject to any disclaimer, the term of this patent is extended or adjusted under 35 U.S.C. 154(b) by 100 days.

(21) Appl. No.: 16/501,369

(22) Filed: Apr. 1, 2019

(65) Prior Publication Data

US 2020/0307526 A1 Oct. 1, 2020

(51) Int. Cl.
| | | |
|---|---|---|
| *E01C 19/26* | (2006.01) | |
| *B60S 1/68* | (2006.01) | |
| *A01B 29/04* | (2006.01) | |
| *A01B 29/06* | (2006.01) | |
| *B08B 1/00* | (2006.01) | |
| *B08B 1/02* | (2006.01) | |
| *E02D 3/026* | (2006.01) | |

(52) U.S. Cl.
CPC .............. *B60S 1/68* (2013.01); *A01B 29/045* (2013.01); *A01B 29/06* (2013.01); *B08B 1/005* (2013.01); *B08B 1/02* (2013.01); *E02D 3/026* (2013.01); *E02D 2450/00* (2013.01)

(58) Field of Classification Search
CPC .................................. B60S 1/68; B08B 1/005
See application file for complete search history.

(56) References Cited

U.S. PATENT DOCUMENTS

| | | | | |
|---|---|---|---|---|
| 1,482,326 A | * | 1/1924 | Sponsler ................... | B60S 1/68 280/855 |
| 1,752,993 A | * | 4/1930 | Livesay ................... | B60S 1/68 280/855 |
| 1,790,006 A | * | 1/1931 | Garrett ...................... | B60S 1/68 280/855 |
| 1,837,946 A | * | 12/1931 | Bosch .......................... | 280/855 |
| 1,875,252 A | * | 8/1932 | Meyer ...................... | B60S 1/68 280/855 |
| 1,924,626 A | * | 8/1933 | Roddel ..................... | B60S 1/68 280/855 |

(Continued)

FOREIGN PATENT DOCUMENTS

| | | | | |
|---|---|---|---|---|
| DE | 102010048868 A1 | * | 4/2012 | ................ B60S 1/68 |
| DE | 102012005112 A1 | * | 9/2013 | ........... E01C 19/238 |

(Continued)

*Primary Examiner* — Thomas B Will
*Assistant Examiner* — Katherine J Chu
(74) *Attorney, Agent, or Firm* — von Briesen & Roper, s.c.

(57) ABSTRACT

A cleaner finger assembly for cleaning compactor teeth on a compactor wheel of a compactor machine includes at least one cleaner finger assembly. The cleaner finger assembly includes a cleaner finger stack and a plurality of fasteners for mounting the cleaner finger stack. The cleaner finger stack includes at least one cleaner finger with a longitudinal axis, a tip for engaging a compactor wheel surface, and a plurality of mounting apertures. The cleaner finger also includes a notch extending from an edge of the cleaner finger toward the longitudinal axis. The cleaner finger failing at the location of the notch when the cleaner finger tip is engaged by debris with a tension force greater than a tip anchor tension capacity of the finger tip anchoring mechanism.

19 Claims, 7 Drawing Sheets

(56) References Cited

U.S. PATENT DOCUMENTS

| | | | | |
|---|---|---|---|---|
| 1,932,054 A * | 10/1933 | Von Brethorst | ......... | B60S 1/68 |
| | | | | 280/856 |
| 1,942,655 A | 1/1934 | McCormick et al. | | |
| 2,738,986 A * | 3/1956 | Pelton | ....................... | B60S 1/68 |
| | | | | 280/856 |
| 3,135,559 A * | 6/1964 | Alfes | ........................ | B60B 7/02 |
| | | | | 301/37.28 |
| 3,633,471 A | 1/1972 | Randour | | |
| 3,837,752 A * | 9/1974 | Shewchuk | .............. | F21V 21/06 |
| | | | | 403/2 |
| 3,851,988 A | 12/1974 | Komatsu | | |
| 4,066,235 A * | 1/1978 | Hashiguchi | ............... | B60R 1/04 |
| | | | | 248/482 |
| 4,818,040 A * | 4/1989 | Mezzancella | ............ | B60S 1/68 |
| | | | | 280/855 |
| 5,360,288 A | 11/1994 | O'Neill et al. | | |
| 5,474,408 A * | 12/1995 | Dinitz | ................... | F16B 31/021 |
| | | | | 256/13.1 |
| 6,536,851 B2 * | 3/2003 | Grob | ..................... | B62D 55/088 |
| | | | | 305/100 |
| 7,163,354 B2 * | 1/2007 | Runestad | ................. | E02D 3/026 |
| | | | | 172/606 |
| 9,033,613 B2 * | 5/2015 | Dykhnich | ................ | E02D 3/032 |
| | | | | 404/129 |
| 9,670,628 B2 * | 6/2017 | Bletscher | ............... | E01C 19/238 |
| 10,507,804 B1 * | 12/2019 | Chandler | ............... | E02D 3/0265 |
| 10,712,470 B2 * | 7/2020 | Vasbo | ...................... | G01V 1/38 |
| 10,800,150 B2 * | 10/2020 | Westover | ................ | B08B 1/005 |
| 2004/0114999 A1 * | 6/2004 | Runestad | ................. | E02D 3/026 |
| | | | | 404/129 |
| 2006/0119171 A1 * | 6/2006 | Reese | ..................... | B60B 3/142 |
| | | | | 301/64.301 |
| 2007/0261573 A1 * | 11/2007 | Cameron | ................... | B08B 1/00 |
| | | | | 100/174 |
| 2013/0115001 A1 * | 5/2013 | Von Vett | ................. | E02D 3/026 |
| | | | | 404/129 |
| 2015/0271981 A1 * | 10/2015 | Degelman | .............. | A01B 29/06 |
| | | | | 172/165 |
| 2020/0141437 A1 * | 5/2020 | Weaver | ................. | F16B 31/021 |

FOREIGN PATENT DOCUMENTS

| | | | | |
|---|---|---|---|---|
| EP | 2386450 | | 11/2011 | |
| GB | 613631 A * | | 12/1948 | ............... B60S 1/68 |

\* cited by examiner

NOTCHED COMPACTOR CLEANER FINGER

TECHNICAL FIELD

The present disclosure relates generally to compactor machines, and, more specifically, to cleaner fingers for cleaning debris from between adjacent rows of compactor teeth on an outer surface of a compactor wheel.

BACKGROUND

A compactor is a type of self-propelled work machine that may be used in a variety of applications, such as compacting fill dirt on a construction site or compacting debris in a landfill. Landfill compactors crush and compact waste and refuse to reduce the size and bulk of the material in order to maximize the landfill's available capacity. To obtain maximum compaction and crushing of refuse and other materials, a typical landfill compactor will include specialized wheels with a number of rigid compactor teeth. The compactor teeth are circumferentially mounted on the outer surface of the compactor wheels, and are arranged in rows that are generally evenly spaced longitudinally across the outer surface. During operation, residual waste and other materials can collect on the wheels and between the compactor teeth, impeding subsequent compacting. To remove the residual material, a cleaner finger assembly is typically used. The cleaner finger assembly, which includes a number of individual cleaner fingers, is mounted to the compactor proximate the wheel. As the wheel rotates, the cleaner fingers scrape residual material from between the rows of compactor teeth.

Various types of cleaner fingers or bars have been used in the past to clean debris between adjacent rows of compactor teeth. In most applications, however, the cleaner teeth are thick, rectangular bars, oriented with respect to each compactor wheel in order to scrape clogged debris from the area between rows of compactor teeth. The cleaner fingers are generally designed to withstand load forces typical of removal of mud and small debris from the compactor wheels. However, landfill compactors often encounter large debris, such as refrigerators and mattresses, or harsh debris, like barbed wire and industrial waste. These materials create higher load forces than the cleaner fingers are designed to withstand. When high load forces occur, typical cleaner fingers often fail in ways that cause severe damage to the cleaner finger assembly, as well as to the compactor machine frame and lower powertrain components. Damage of this type is both costly and timely to repair or replace.

Detachable wheel scrapers have also been developed. For example, U.S. Pat. No. 1,942,655 discloses a scraper assembly that pivots within a housing. The scraper tool is adjustable secured in a socket or bore, and pivots as the scraper contacts materials on a wheel. When the scraper is met with abnormal resistance during scraping, such as wedged stone, the continued forward travel of the wheel would move the scraper and scraper assembly upward, causing the scraper assembly to pivot. If the debris is not cleared, or the scraper becomes stuck, the scraper assembly continues to pivot out of an operative position. The scraper assembly must then manually be returned to an operative position.

SUMMARY

In one aspect of the present disclosure, a compactor wheel cleaning assembly for cleaning compactor teeth on a compactor wheel of a compactor machine is disclosed. The compactor wheel cleaning assembly may include a rigid support arm and at least one cleaner finger assembly mounted to the rigid support arm. Each cleaner finger assembly may include a cleaner finger stack with at least one stacked cleaner finger. The cleaner finger stack may include an engagement end for scraping debris from the compactor wheel and a mounting end opposite the engagement end for mounting the cleaner finger stack to the rigid support arm. Each cleaner finger may have a tip proximate the engagement end of the cleaner finger stack, as well as a plurality of mounting apertures proximate the mounting end of the cleaner finger stack. Each cleaner finger may include at least one notch positioned between the engagement and mounting ends of the cleaner finger stack. The notch may extend from an edge of the cleaner finger toward a center of the cleaner finger. A plurality of fasteners may be used to mount the cleaner finger stack to the rigid support arm.

In another aspect of the present disclosure, a cleaner finger assembly for cleaning debris from a compactor wheel of a compactor machine is disclosed. The compactor machine may include a compactor body, a plurality of compactor wheels, and a compactor wheel cleaner assembly. A cleaner assembly support arm may be disposed proximate an outer surface of the compactor wheel. The cleaner finger assembly may include at least one cleaner finger stack with at least one stackable cleaner finger. Each cleaner finger stack may include an engagement end for scraping debris from the compactor wheel, and a mounting end opposite the engagement end for mounting the cleaner finger stack to the cleaner assembly support arm. Each cleaner finger may have a tip located proximate the engagement end, a plurality of mounting apertures proximate the mounting end, and at least one notch. The notch may be positioned between the engagement end of the cleaner finger stack and the mounting end of the cleaner finger stack, and may extend from an edge of the cleaner finger toward a center of the cleaner finger. A plurality of fasteners may be used to mount the cleaner finger stack to the cleaner assembly support arm.

In a further aspect of the present invention, a method of cleaning compactor teeth on a compactor wheel of a compactor machine is disclosed. The compactor machine may include a compactor body and a plurality of compactor wheels, with each compactor wheel having a plurality of teeth arranged in rows and evenly spaced longitudinally across an outer surface of the compactor wheel. The method of cleaning compactor teeth may include fastening at least one cleaner finger stack to a rigid support arm using a plurality of fasteners. Each cleaner finger stack may include at least one cleaner finger, with each cleaner finger stack having an engagement end for scraping debris from the compactor wheel and a mounting end opposite the engagement end. Each cleaner finger may include at least one notch positioned between the engagement end and the mounting end of the cleaner finger stack. The notch may extend from an edge of the cleaner finger toward a center of the cleaner finger, and the cleaner finger stack may have a collective load force capacity at the at least one notch. Next, the method of cleaning compactor teeth may include mounting the rigid support arm to the compactor body, proximate the plurality of compactor wheels using a plurality of fasteners. Each cleaner finger stack may be positioned between pairs of adjacent tooth rows. The compactor machine may then be operated in a forward or reverse in direction in order to compact debris using the plurality of teeth on the plurality of compactor wheels. As the compactor wheels turn, the engagement end of each cleaner finger stack may scrape residual debris from between the pairs of adjacent tooth rows. After sustaining, at the engagement end of the cleaner finger stack, a force greater than the collective load force capacity; the cleaner finger stack may fail at the positions of the at least one cleaner finger stack at the position of the at least one notch These and other aspects and features of the present disclosure will be better understood upon reading the following detailed description, when taken in conjunction with the accompanying drawings.

DETAILED DESCRIPTION

Figure 1:
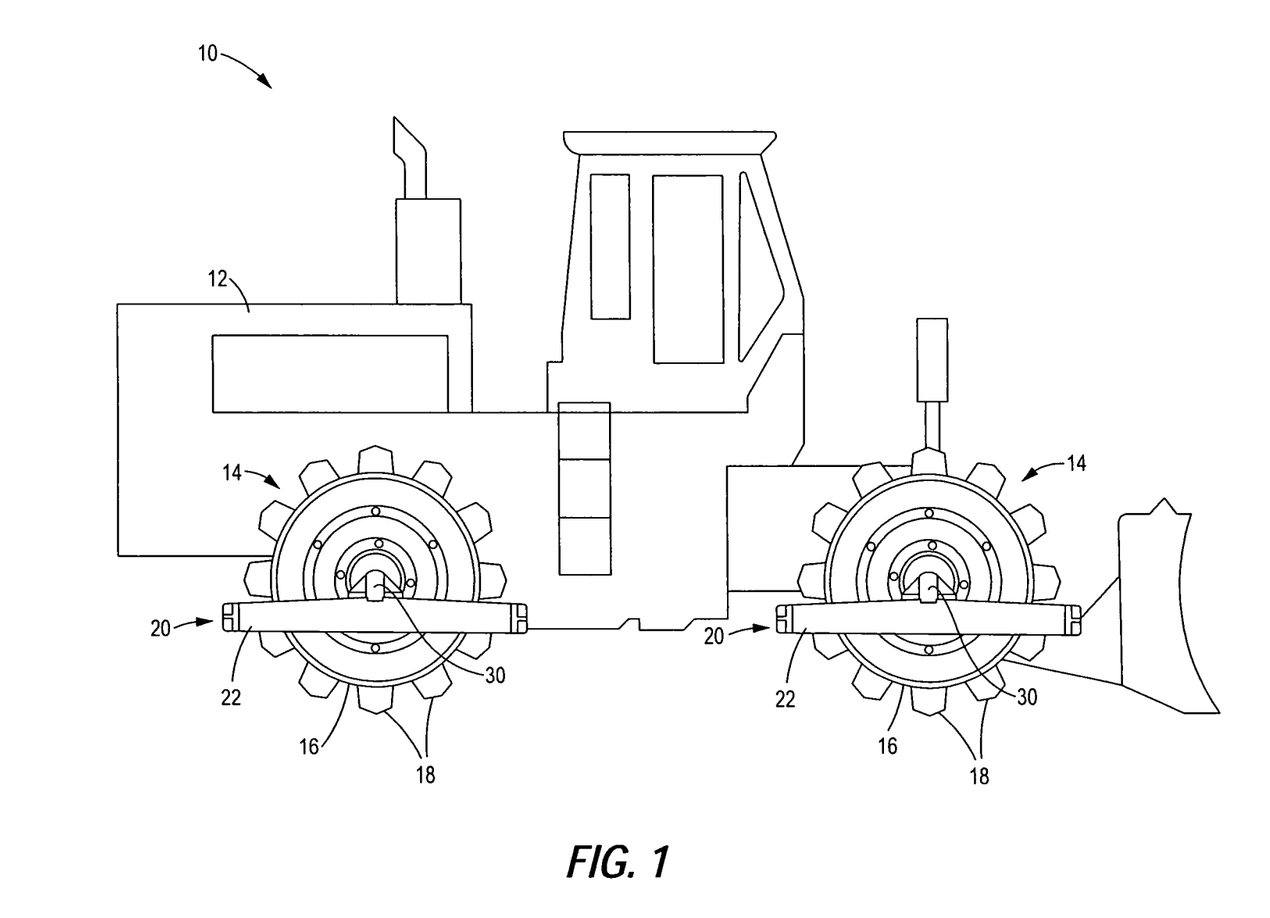
FIG. 1 is a side view of a landfill compactor machine in which cleaner finger assemblies in accordance with the present disclosure may be implemented.

Reference will now be made in detail to specific embodiments or features, examples of which are illustrated in the accompanying drawings. Wherever possible, corresponding or similar reference numbers will be used throughout the drawings to refer to the same or corresponding parts. FIG. 1 illustrates a side view of a landfill compactor machine 10, according to a preferred embodiment of the present disclosure. The landfill compactor machine 10 is illustrated with compactor wheel cleaner assemblies and cleaner finger assemblies according to the present disclosure.

The landfill compactor machine 10 includes a compactor body 12 having a plurality of compactor wheels 14 rotatably mounted thereto. One or more of the compactor wheels 14 is operatively coupled to a power source, such as an internal combustion engine (not shown), by a power transmission (not shown). Together, the engine and transmission drive the compactor wheels 14 and propel the landfill compactor machine 10 over the landfill surface. Each compactor wheel 14 has an outer surface 16 on which a plurality of compactor teeth 18 are mounted. The compactor teeth 18 not only provide traction for the landfill compactor machine 10, but also aid in crushing and compacting landfill waste, debris, and other materials. The plurality of compactor teeth 18 are arranged circumferentially around the outer surface 16 of each compactor wheel 14 in a manner illustrated and described further hereinafter.

Figure 2:
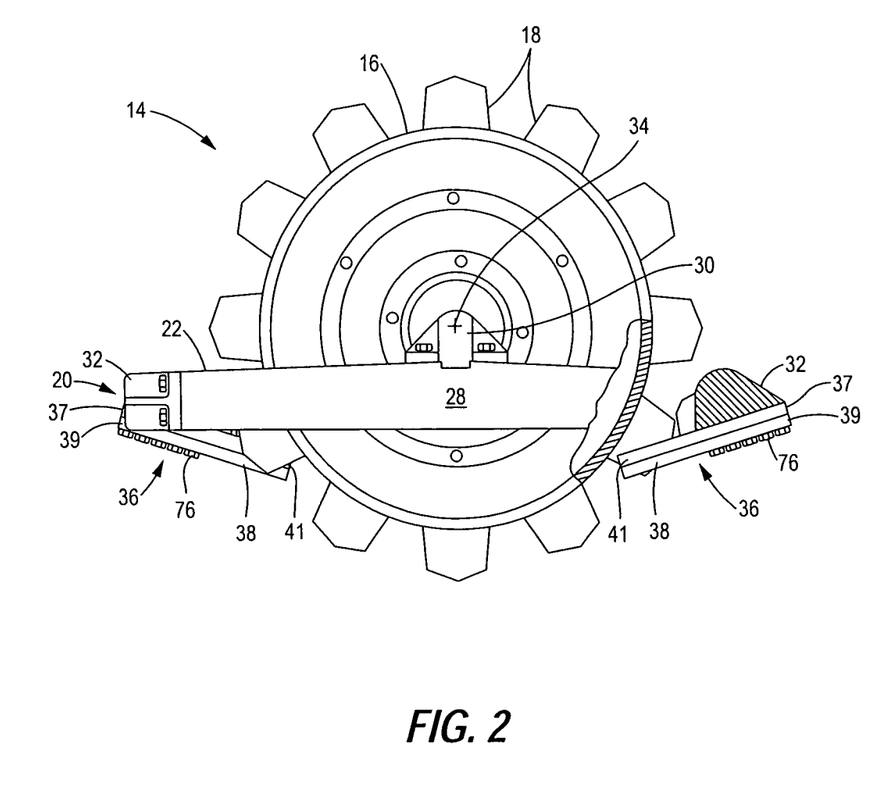
FIG. 2 is a side view of one of the compactor wheels of the landfill compactor machine of FIG. 1 with a portion of the compactor wheel and a cleaner finger support frame broken away to show a compactor wheel cleaner assembly in accordance with the present disclosure.
Figure 3:
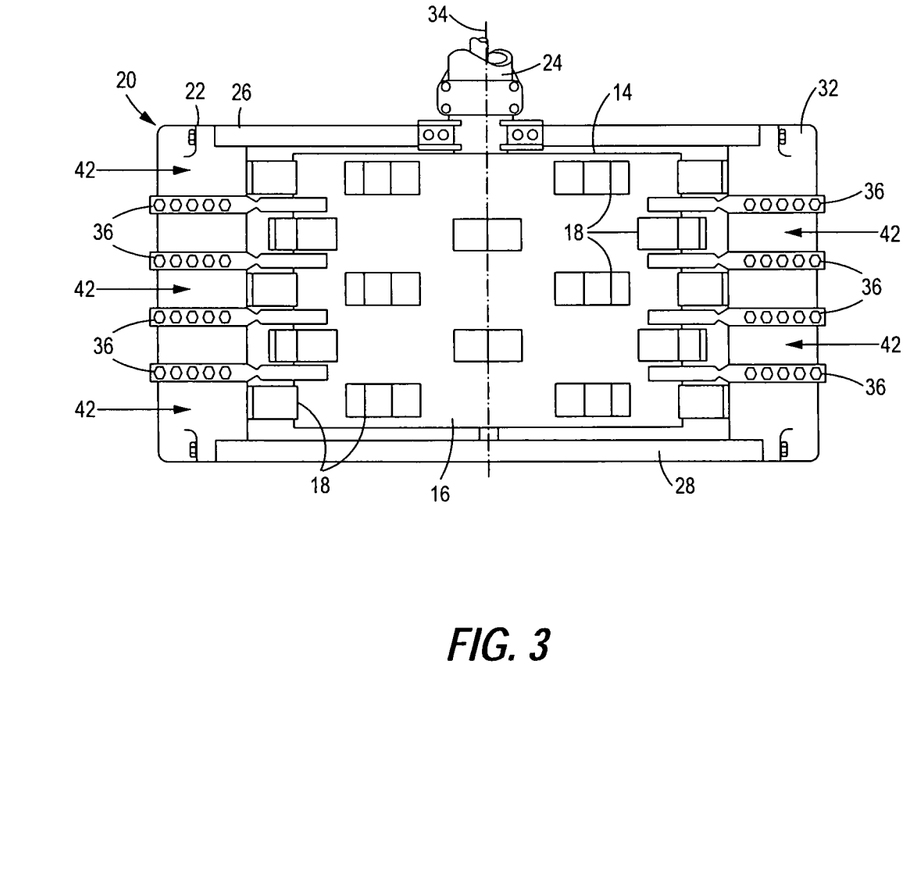
FIG. 3 is a bottom view of the compactor wheel and compactor wheel cleaner assembly of FIG. 2.

As shown in FIGS. 1-3, a compactor wheel cleaner assembly 20 may be mounted proximate each compactor wheel 14 by a cleaner assembly frame 22, which is mounted to the compactor body 12 and/or an axle 24 of the compactor wheel 14. Referring specifically to FIGS. 2 and 3, the cleaner assembly frame 22 may include an inboard frame member 26 mounted about the axle 24 at an inboard side of the compactor wheel 14, and an outboard frame member 28 mounted at an outboard side of the compactor wheel by a mounting bracket 30. Opposing cleaner assembly support arms 32 extend between the frame members 26, 28 on the front and rear sides of the compactor wheel 14. Mounted to each cleaner assembly support arm 32 are a plurality of cleaner finger assemblies 36. Each cleaner finger assembly 36 includes at least one cleaner finger stack 37 and a plurality of fasteners 76. The cleaner finger stack 37 may include one or more stackable cleaner fingers 38. The cleaner fingers stack 37 may also include a mounting portion 39 for mounting the cleaner finger stack to the corresponding cleaner assembly support arm 32, and an opposite engagement portion 41 for cleaning debris from the wheel 14 of the compactor machine 10. The cleaner assembly support arms 32 may be arranged parallel to a longitudinal axis 34 of the compactor wheel 14 to ensure debris is removed evenly during rotation and cleaning of the compactor wheel.

The cleaner assembly support arms 32 and the cleaner finger assemblies 36 are arranged so that the engagement portion 41 of each cleaner finger stack 37 is disposed proximate the compactor wheel outer surface 16 on either side of the compactor wheel 14. As best seen in FIG. 3, the compactor teeth 18 are arranged in a plurality of tooth rows 42, spaced longitudinally across the outer surface 16 of the compactor wheel 14. The cleaner finger assemblies 36 are consequently positioned on either side of the compactor wheel 14, between each pair of adjacent tooth rows 42. With this arrangement, tips 40 of each cleaner finger 38 are able to scrape debris from between the compactor teeth 18 as the compactor wheel 14 rotates in either direction.

Figure 4:
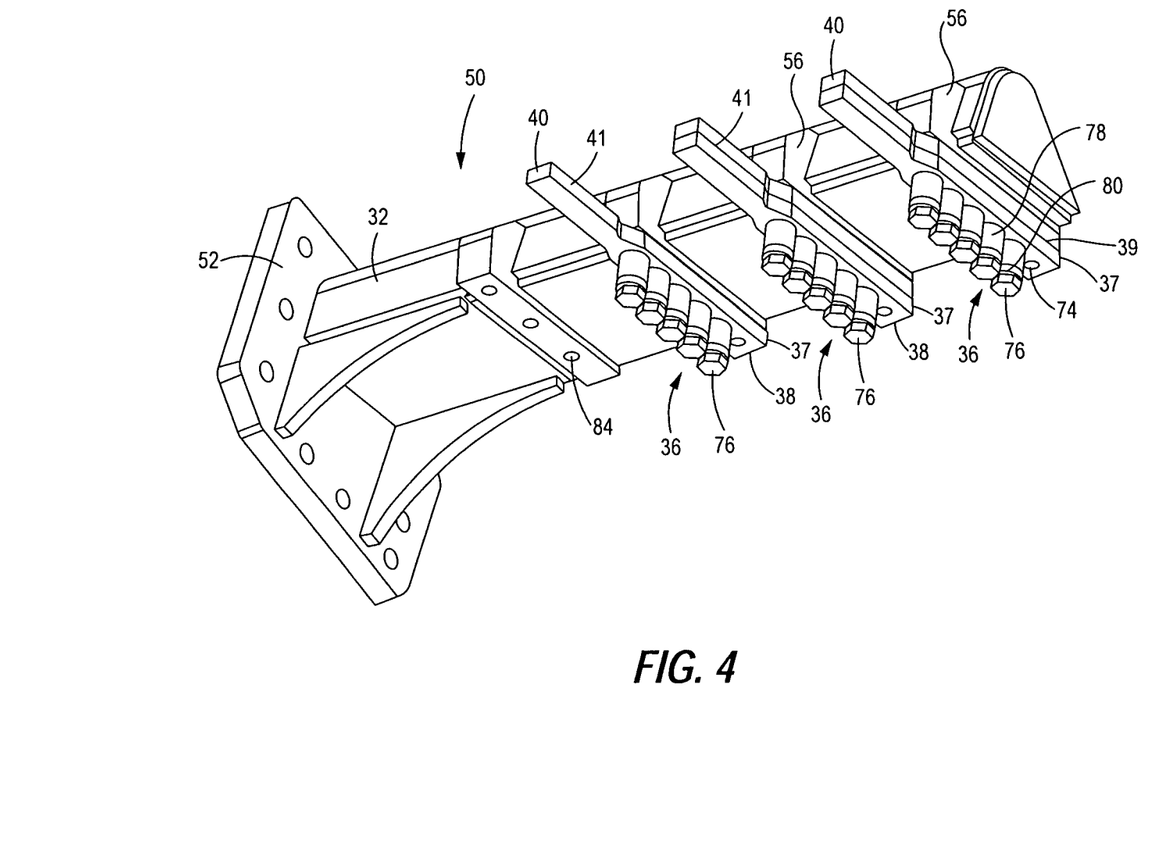
FIG. 4 is an isometric view of an embodiment of a compactor wheel cleaner assembly in accordance with the present disclosure.

FIG. 4 illustrates an alternative embodiment of a compactor wheel cleaner assembly 50 that may be mounted directly to the compactor body 12 proximate one of the compactor wheels 14. The compactor wheel cleaner assembly 50 may include a cleaner assembly support arm 32 as described above and a body mounting bracket 52. The body mounting bracket 52 may be anchored to the compactor body 12 using a plurality of fasteners (not shown). As illustrated and discussed above, the cleaner assembly support arm 32 may be fastened to the compactor body 12 proximate one side of the compactor wheel 14, such that the cleaner finger tips 40 of each cleaner finger 38 in each of the cleaner finger stacks 37 are properly positioned between the pairs of adjacent tooth rows 42. A plurality of gussets 56 may extend from the cleaner assembly support arm 32 to provide additional support for each cleaner finger assembly 36. An additional compactor wheel cleaner assembly 50 that is a mirror image of that shown in FIG. 4 may be mounted to the compactor body 12 on the opposite side of the compactor wheel 14 so that the compactor wheel may be cleaned by the cleaning finger assemblies 36 when it rotates in either direction.

Figure 5:
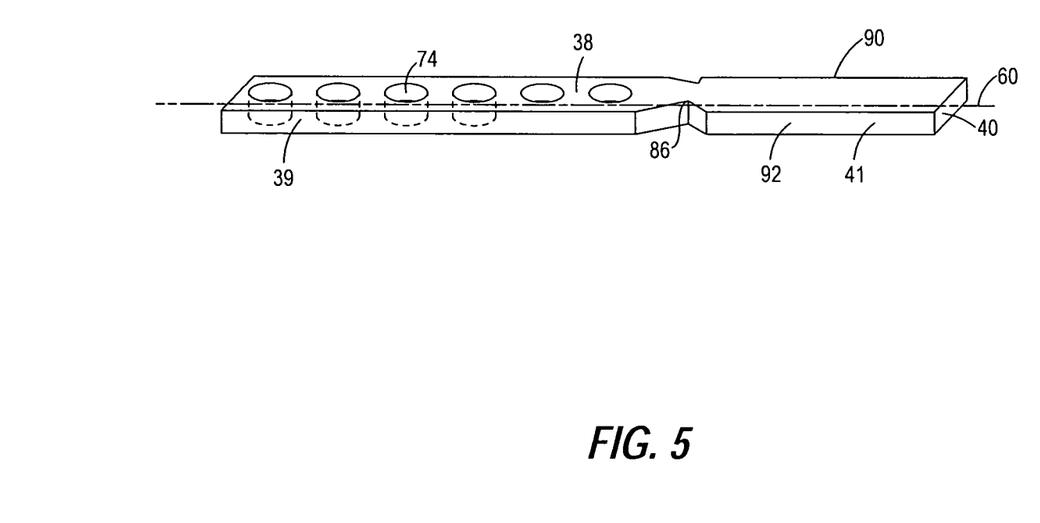
FIG. 5 is an isometric view of a stackable cleaner finger of a cleaner finger assembly in accordance with the present invention.
Figure 6:
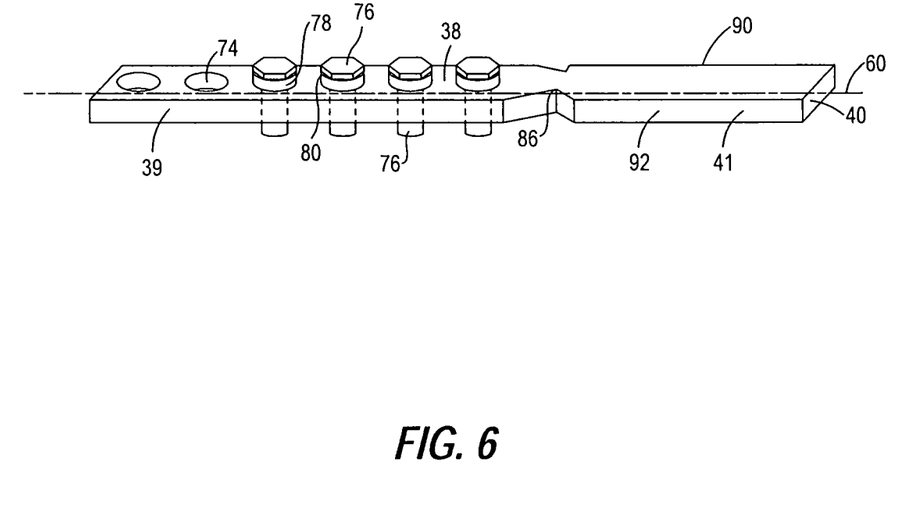
FIG. 6 is an isometric view of a stackable cleaner finger of a cleaner finger assembly in accordance with the present invention.

With reference to FIGS. 4-6, an embodiment of the stackable cleaner finger 38 with a notched geometry is illustrated. The cleaner finger 38 has a longitudinal axis 60 in a lengthwise direction, and is generally rectangular in shape. As mentioned above, each cleaner finger 38 has a tip 40 proximate the engagement portion 41 of the cleaner finger stack 37, and a plurality of mounting apertures 74 proximate the mounting portion 39 of the cleaner finger stack. Fixing the cleaner finger stack 37 to the support arm 32 is achieved via a plurality of fasteners 76. Each fastener 76 utilizes a spacer 78, a washer 80 and a fastener 76 (e.g. a bolt). Since the number of stacked cleaner fingers 38 may vary, the height of the spacer 78 depends on how many cleaner fingers 38 are stacked during installation. For example, three stacked cleaner fingers 38 in the cleaner finger stack 37 requires a shorter spacer 78 than stacking one cleaner finger 38.

During installation of a bolt 76, one bolt is inserted first through the washer 80 and the spacer 78. The bolt 76 is then inserted through the mounting apertures 74 for reception by corresponding bore holes 84 in the cleaner assembly support arm 32. The bore holes 84 are arranged along gussets 56 included on the support arm 32 to provide stability to the cleaner finger stack 37. To further ensure proper installation of the fasteners 76, the width of the cleaner finger 38 proximate the mounting portion 39 is greater than the width of the cleaner finger at its tip 40. FIG. 6 specifically illustrates the cleaner finger assembly 36 of the present embodiment ready for installation on the cleaner assembly support arm 32.

Referring specifically to FIGS. 5 and 6, the body of the finger cleaner 38 may be made from a rigid material such as a metal or a metallic alloy (e.g. low-strength steel), and may be burned to shape from a thin (e.g. 25 mm) plate. As mentioned above, as the tip 40 of the cleaner finger 38 encounters debris caught in the compactor wheel 14, a certain amount of force is placed on the engagement portion 41 of the cleaner finger stack 37 (FIG. 4). Without a predictable failure location, the cleaner fingers 38 would likely fail by breaking off or stripping out the bore holes 84. This type of failure leaves consumers with time consuming and expensive repairs, cutting down on efficiency and economy of the compactor machines 10. As such, the present finger cleaner 38 includes a predictable failure location in the form of notches 86. The notch 86 ensures the finger cleaner 38 will fail at the location of the notch before any fasteners 76 fail by ripping out of the bore holes 84.

Each notch 86 is positioned along the body of the cleaner finger 38 between the tip 40 and the mounting apertures 74. Being generally rectangular in shape, the cleaner finger 38 includes a pair of opposing side edge 90, 92. The notch 86 extends from the side edges 90, 92 toward the center longitudinal axis 60 and is dimensioned to create a predictable point of failure for the cleaner finger 38. Failure, as will be discussed more below, may include bending or breaking of the cleaner finger 38 at the notch 86. In the illustrated embodiment, each notch 86 is generally shaped as an obtuse triangular prism; however, other formations (e.g. hemispherical) are also contemplated to facilitate failure.

Those skilled in the art will understand that the geometric configuration of the cleaner finger assembly 36 is illustrated and described herein is exemplary. The mounting end 41 of the cleaner finger 38 may have any shape necessary to facilitate attachment to the cleaner assembly support arm 32, and the cleaner finger tip 40 may have other shapes as necessary for effectively cleaning debris from the compactor wheel outer surface 16. Additional factors may be taken into consideration in designing the cleaner finger assembly 36, and alternative configurations are contemplated.

INDUSTRIAL APPLICABILITY

The teachings of the present disclosure are beneficial to compacting machines, and more particularly to landfill compacting machines. A series of steps involved in cleaning compactor teeth 18 on a compactor wheel 14 of a compactor machine 10 is illustrated in a flowchart format in FIG. 7. As shown therein, in a first step 100, at least one notched cleaner finger 38 is stacked to form at least one cleaner finger stack 37. The notched cleaner finger 38 includes at least one notch 86. A stacked plate design allows a load force capacity of the stacked cleaner fingers to be increased or decreased by adding or subtracting a single cleaner finger. For example, a cleaner finger stack having only one cleaner finger may have a theoretical bolted joint capacity of 11 kN, while a cleaner finger stack having two cleaner fingers may have a theoretical bolted joint capacity of 47 kN. Adding a third cleaner finger to the cleaner finger stack increases the theoretical bolted joint capacity to 100 kN; but, with a capacity as high as 100 kN, there may be a risk that the mounting fasteners fail before the individual cleaner fingers fail, thereby causing costly and timely damage to the landfill compactor.

Figure 7:
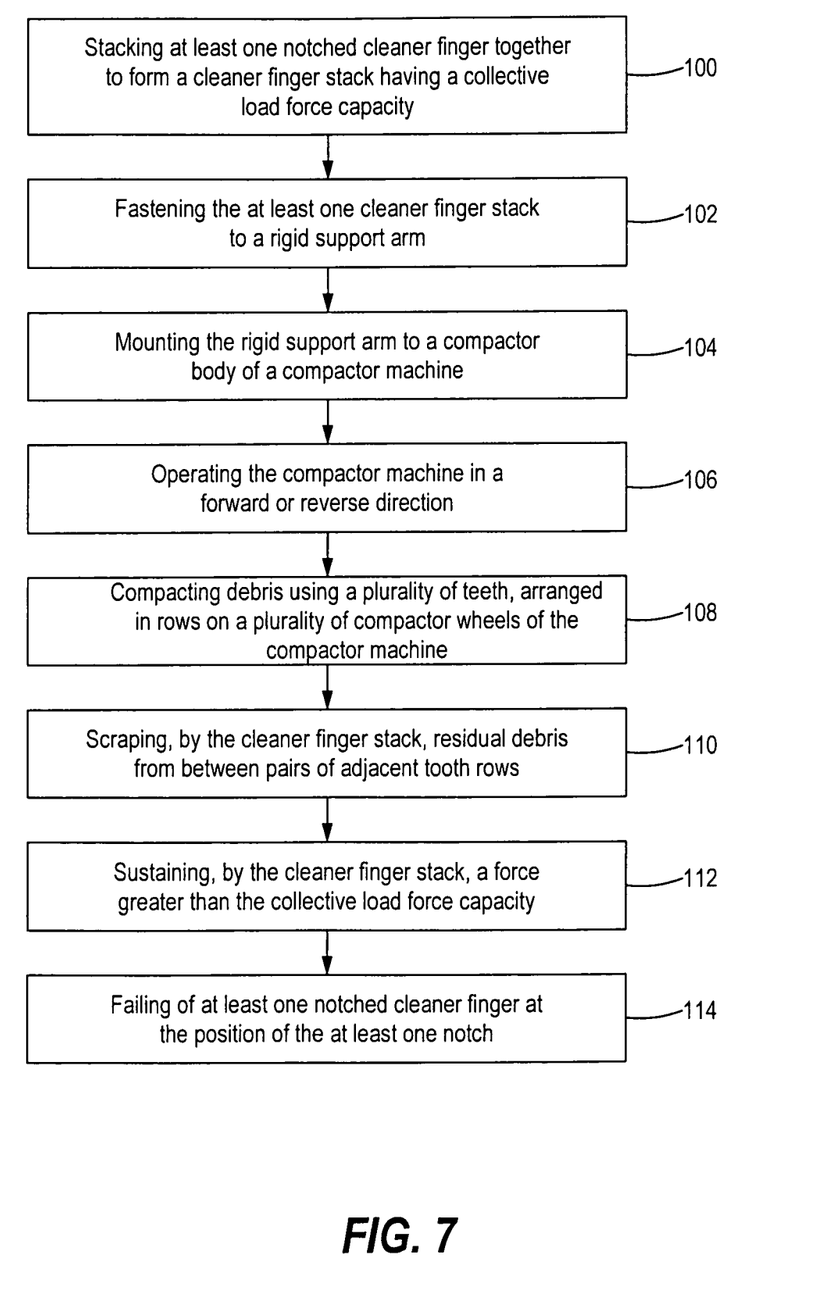
FIG. 7 is a flowchart describing steps for cleaning a compactor wheel in accordance with the present invention.

In a second step 102, the cleaner finger stack 37 is fastened to the rigid support arm 32 using a plurality of fasteners 76. In a third step 104, the rigid support arm 32 is mounted to the compactor body proximate one of the plurality of compactor wheels using a plurality of fasteners. This may be accomplished through any means known in the art for fastening pieces of equipment together, including, but not limited to using bolts, spacers and washers.

After installation, the compactor machine 10 is ready for operation in steps 106 and 108. With each cleaner finger stack 37 being positioned proximate the compactor wheel 14 and between pairs of adjacent rows of compactor teeth 18, the compactor machine 10 may be operated in both forward and reverse directions. During operation in either direction, at step 110, the tips 40 of the cleaner fingers 38 in each cleaner finger stack engage the compactor wheel 14 and scrape residual debris from between the pairs of adjacent rows of compactor teeth 18.

During operation, it is common for the compactor wheels 14 to collect not only residual debris, but also larger pieces of material may become trapped, including barbed wire or other similar materials. When this occurs, the cleaner finger stack 37, at step 112, sustains load forces greater than the cleaner finger stack's theoretical bolted joint capacity, causing one or more of the cleaner fingers 38 to fail. The cleaner finger assemblies 36 illustrated and described herein are designed to fail in a way that minimizes damage to mounting bars, machine frames, lower powertrain components and other components of the compactor machine 10 while reducing maintenance costs for the machine owner. At the final step 114, at least one notched cleaner finger 38 will fail at the position of the at least one notch 86. The geometry of the notch 86 allows the cleaner finger 38 to fail by bending or breaking before the other pieces of the cleaner assembly are destroyed.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A compactor wheel cleaner assembly for cleaning compactor teeth on a compactor wheel of a compactor machine, the compactor wheel cleaning assembly comprising:

a rigid support arm;
a cleaner finger assembly mounted to the rigid support arm, each cleaner finger assembly comprising:
  a cleaner finger stack including a stacked cleaner finger, the cleaner finger stack including an engagement end for scraping debris from the compactor wheel and a mounting end opposite the engagement end for mounting the cleaner finger stack to the rigid support arm, each cleaner finger having a tip proximate the engagement end and a plurality of mounting apertures proximate the mounting end, each cleaner finger including a notch positioned between the engagement end and the mounting end, the notch extending from an edge of the cleaner finger toward a center of the cleaner finger;
  wherein the cleaner finger stack is arranged such that when debris on the compactor wheel engages the engagement end of the cleaner finger stack with a force greater than a load force capacity of the cleaner finger stack at the location of the notch, the cleaner finger will fail at the location of the notch; and
  a plurality of fasteners for mounting the cleaner finger stack to the rigid support arm.

2. The compactor wheel cleaner assembly of claim 1, wherein the rigid support arm includes at least one gusset, each gusset corresponding to one cleaner finger assembly and including a plurality of bore holes, each bore hole dimensioned to accommodate installation of one fastener.

3. The compactor wheel cleaner assembly of claim 2, wherein each fastener is a bolt installed from a bottom surface of the cleaner finger through one of the plurality of mounting apertures of each cleaner finger in the cleaner finger stack, and into one of the gusset bore holes.

4. The compactor wheel cleaner assembly of claim 1, wherein a width of the engagement end of the finger cleaner at the tip is smaller than a width of the cleaner finger proximate the mounting end of the finger cleaner stack.

5. The compactor wheel cleaner assembly of claim 1, wherein a load force capacity of the mounting end of the finger cleaner stack is greater than the load force capacity of the finger cleaner stack at the location of the notch.

6. A cleaner finger assembly for cleaning debris from a compactor wheel of a compactor machine, the compactor machine having a compactor body, a plurality of compactor wheels, and a compactor wheel cleaner assembly with a cleaner assembly support arm disposed proximate an outer surface of the compactor wheel, the cleaner finger assembly comprising:
  a cleaner finger stack, each cleaner finger stack including a stackable cleaner finger, each cleaner finger stack including an engagement end for scraping debris from the compactor wheel and a mounting end opposite the engagement end for mounting the cleaner finger stack to the cleaner assembly support arm, each cleaner finger having a tip proximate the engagement end and a plurality of mounting apertures proximate the mounting end, each cleaner finger including a notch positioned between the engagement end and the mounting end, the notch extending from an edge of the cleaner finger toward a center of the cleaner finger;
  wherein the cleaner finger stack is arranged such that when debris on the compactor wheel engages the engagement end of the cleaner finger stack with a force greater than a load force capacity of the cleaner finger stack at the location of the notch, the cleaner finger will fail at the location of the notch; and
  a plurality of fasteners for mounting each cleaner finger stack to the cleaner assembly support arm.

7. The cleaner finger assembly of claim 6, wherein each of the compactor wheels includes a plurality of teeth arranged in rows and evenly spaced longitudinally across an outer surface of the compactor wheel.

8. The compactor wheel cleaner assembly of claim 6, wherein the cleaner assembly support arm includes at least one gusset, each gusset corresponding to one cleaner finger assembly and including a plurality of bore holes, each bore hole dimensioned to accommodate installation of one fastener.

9. The compactor wheel cleaner assembly of claim 8, wherein each stackable cleaner finger includes six mounting apertures, and wherein each cleaner finger stack is mounted to the cleaner assembly support arm using five fasteners.

10. The compactor wheel cleaner assembly of claim 9, wherein each of the five fasteners are inserted through corresponding mounting apertures in each finger cleaner in the cleaner finger stack, and installed in one of the gusset bore holes.

11. The compactor wheel cleaner assembly of claim 10, wherein each cleaner finger includes two notches, the two notches extending from opposing edges of the cleaner finger toward the center of the cleaner finger.

12. The compactor wheel cleaner assembly of claim 11, wherein each cleaner finger stack includes two stacked cleaner fingers, each cleaner finger stack having, after mounting, a first collective load force capacity at the location of the cleaner finger notches and a second collective load force capacity at the mounting end.

13. The compactor wheel cleaner assembly of claim 12, wherein the second collective load force capacity is greater than the first collective load force capacity such that when debris on the compactor wheel engages the cleaner finger tip with a force greater than the first collective load force capacity, the cleaner finger fails at the location of the notch.

14. The compactor wheel cleaner assembly of claim 13, wherein the first collective load force capacity is 47 kN.

15. The compactor wheel cleaner assembly of claim 7, wherein each cleaner finger tip is dimensioned to engage the compactor wheel between adjacent rows of teeth.

16. A method of cleaning compactor teeth on a compactor wheel of a compactor machine, the compactor machine having a compactor body and a plurality of compactor wheels, each compactor wheel having a plurality of teeth arranged in rows and evenly spaced longitudinally across an outer surface of the compactor wheel, the method comprising:
  stacking a notched cleaner finger to form a cleaner finger stack, the notched cleaner finger having a notch;
  fastening the cleaner finger stack to a rigid support arm using a plurality of fasteners, each cleaner finger stack having an engagement end for scraping debris from the compactor wheel and a mounting end opposite the engagement end, the cleaner finger stack having a collective load force capacity at the notch;
  wherein the notch is positioned between the engagement end and the mounting end, the notch extending from an edge of the cleaner finger toward a center of the cleaner finger;
  mounting the rigid support arm to the compactor body proximate one of the plurality of compactor wheels using a plurality of fasteners, the support arm being installed such that each cleaner finger stack is positioned between pairs of adjacent tooth rows;

operating the compactor machine in a forward or reverse direction;

compacting debris using the plurality of teeth on the plurality of compactor wheels;

scraping, by the engagement end of each cleaner finger stack, residual debris from between the pairs of adjacent tooth rows;

sustaining, at the engagement end of the cleaner finger stack, a force greater than the collective load force capacity;

failing of the notched cleaner finger at the position of the notch.

17. The method of cleaning compactor teeth of claim 16, wherein each cleaner finger stack includes two cleaner fingers.

18. The method of cleaning compactor teeth of claim 17, wherein the collective load force capacity is 47 kN.

19. The method of cleaning compactor teeth of claim 16, wherein the failing step further includes bending or breaking of each cleaner finger in the cleaner finger stack.

* * * * *